United States Patent [19]
Bryll

[11] 3,784,769
[45] Jan. 8, 1974

[54] SEAT SENSOR SAFETY SYSTEM WITH IMPROVED SWITCH SENSOR CONTAINING SLIP CLUTCH COUPLING MEANS

[75] Inventor: Medard Z. Bryll, Palos Park, Ill.

[73] Assignee: Gateway Industries, Inc., Chicago, Ill.

[22] Filed: Dec. 7, 1972

[21] Appl. No.: 312,818

[52] U.S. Cl. ..... 200/52 R, 200/61.58 R, 242/107 R, 340/278
[51] Int. Cl. .......................................... H01h 35/00
[58] Field of Search .................... 200/52 R, 61.16, 200/61.58 R, 61.58 B, 86 R, 86 A; 340/52 C, 52 D, 52 E, 278; 242/107 SB, 107.4, 107.5, 107 R

[56] References Cited
UNITED STATES PATENTS

| | | | |
|---|---|---|---|
| 3,323,750 | 6/1967 | Worth et al. | 242/107.4 |
| 3,437,993 | 4/1969 | Recio et al. | 340/52 E |
| 3,693,147 | 9/1972 | Seo et al. | 340/278 |
| 3,506,305 | 4/1970 | Eineman, Jr. et al. | 340/52 E UX |
| 3,694,593 | 9/1972 | Loose | 200/61.16 X |

Primary Examiner—J. R. Scott
Attorney—William E. Anderson et al.

[57] ABSTRACT

A seat sensor detects occupancy of a vehicle seat upon initial deflection of a portion of the seat caused by seating or removal of a predetermined weight. A seat follower is operable through a coupling means which comprises a slip clutch to operate a switch actuator means in the form of a turnable cam to actuate a switch means after a predetermined extent of seat deflection in either the upward or downward directions irrespective of the total deflection or the initial reference point for the deflection. The cam is limited to a short turning movement and the slip clutch allows the seat follower to continue to travel with additional seat deflection. The preferred seat follower is a cable wound on a reel, and the slip clutch comprises one clutch face on the reel and another clutch face on the cam.

12 Claims, 5 Drawing Figures

PATENTED JAN 8 1974  3,784,769

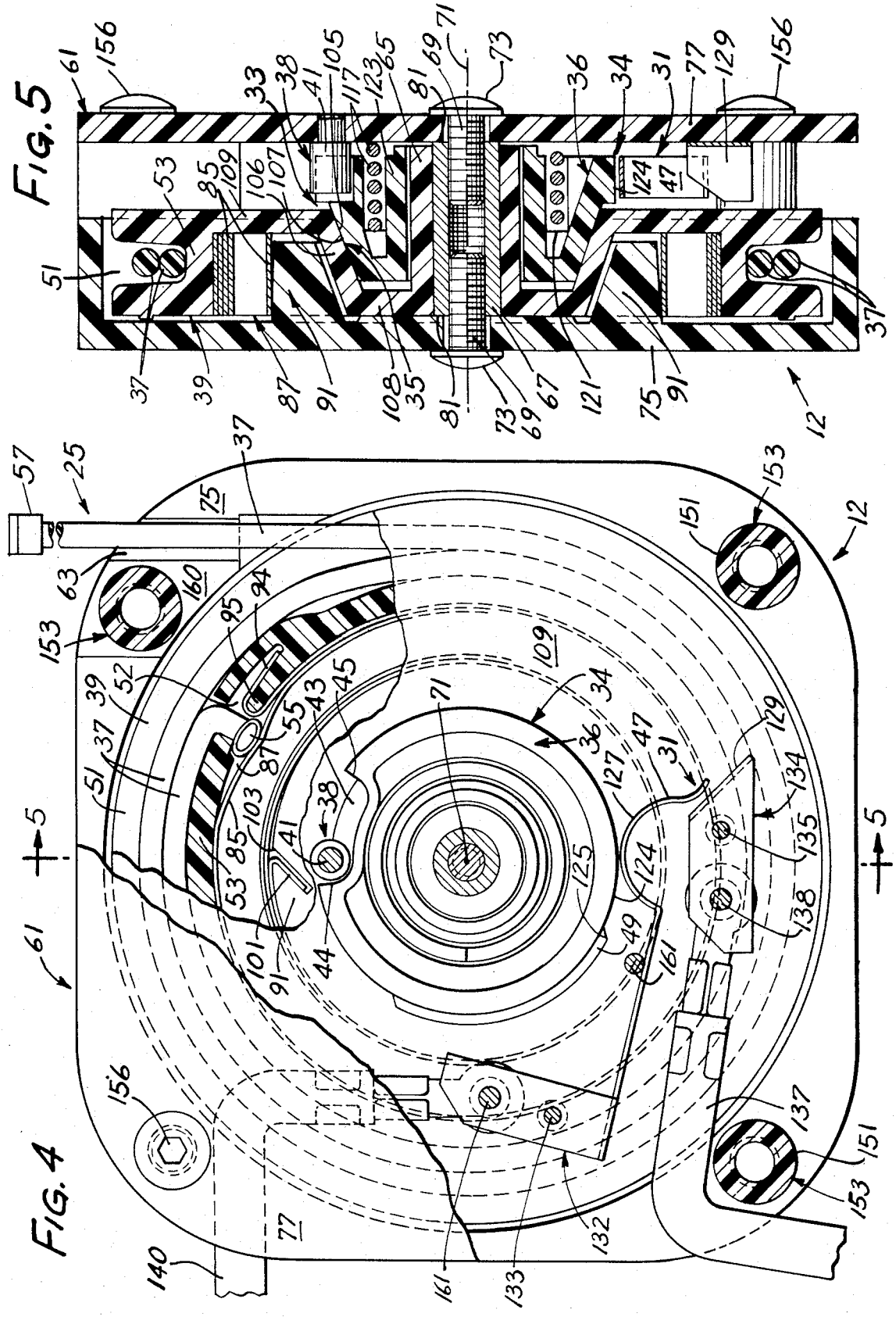

SEAT SENSOR SAFETY SYSTEM WITH IMPROVED SWITCH SENSOR CONTAINING SLIP CLUTCH COUPLING MEANS

This invention relates to a safety system for vehicles and to a seat sensor for detecting an occupant in a vehicle seat.

Automobiles are presently being manufactured with an occupant-sensing device in the seat. One seat sensor includes a beam switch which comprises a pair of long plates or rods 6 inches or more in length. The beam switch is fastened at opposite ends within the seat so that the deflection of the seat thereabove by seating of the occupant bows the beam. The two long plates (or rods) of the beam switch are slidable longitudinally relative to each other, as the lower plate bows with a larger radius of curvature than the upper plate. At one end of the beam is mounted a slider actuator for switch contacts. One of the plates is connected to the slider actuator; and, as the beam bends, the ends of the plates displace relative to each and shift the slider actuator to slide and actuate electrical switch contacts disposed on the other plate. The switch contacts are in an electrical safety circuit which also includes electrical switches associated with respective seat belts, usually the seat belt retractors and/or seat belt buckles, to indicate when the seat belt associated with a given seat position is in use. If the seat belts are not in use at the occupied positions, then an alarm or an ignition cut-off circuit is activated. On the other hand, if the seat belts are in use at each of the occupied seats, the alarm or ignition cut-off circuits are not activated.

The effectiveness of the seat sensor device in the seat is usually calibrated for predetermined minimum weights, for example, 35 pounds. That is, a force of 35 pounds deflects the seat from a reference position sufficient to close the switch. Therefore, lightweight packages, dogs or infants resting at a seat location weighing less than 35 pounds will not require the buckling of the seat belts at their seat location. Seat sensors must not be overly sensitive or else a person of heavy weight sitting in an adjacent seat position on a bench-type seat may activate the seat sensor.

Manifestly, seat sensors disposed within the interiors of seats should have a long life and operate reliably for an extensive number of cycles and for an extensive range of weights of persons above the minimum weight level. Also, seat sensors should be capable of functioning after extended usage which may cause sagging of the seat. That is, after the seat is used for a considerable period and/or has been deflected by persons of heavy weight, the seats may sag and the springs may assume a permanent deflection thereby destroying the initial reference position for switch actuation if the switch requires a fixed reference position for proper operation. As present automobile seats are neither made to rigid or exact tolerances nor positioned within the vehicle body at precise locations, the seat sensor should not necessitate accurate reference locations within the seat or with respect to the vehicle frame.

Moreover, as millions of automobiles are produced and/or sold annually in the United States and seat sensors are required for all of them, a low cost of manufacturing and a low cost of installation are highly important for commercial acceptability of the seat sensor. Thus, a commercially acceptable seat sensor must operate reliably for a large number of cycles and within a demanding environment while being capable of being produced and installed at a modest cost.

Accordingly, a general object of the invention is to provide an improved safety system and seat sensor of the kind described above.

Other objects and advantages of the invention will become apparent from the following detailed description taken in connection with the accompanying drawings in which:

FIG. 4 is an elevational view of the seat sensor of FIG. 1 with portions thereof broken away and in section to illustrate interior portions of the seat sensor; and FIG. 5 is a central cross section of the seat sensor shown in FIG. 4.

Figure 1:
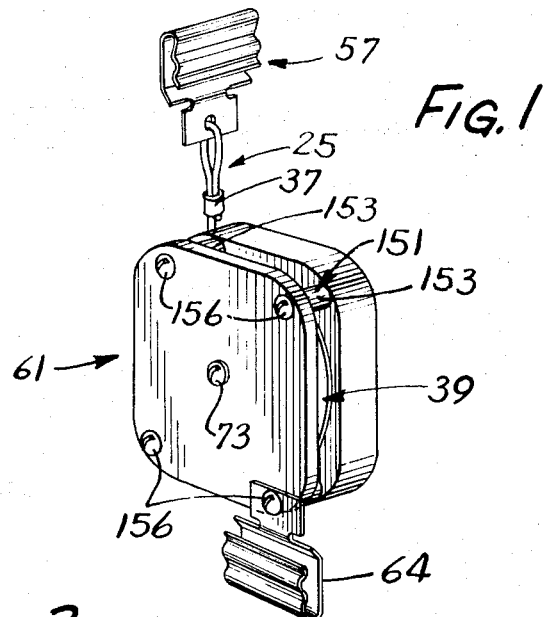
FIG. 1 is an isometric view of a seat sensor embodying the features of the invention.

As shown in the drawings for purposes of illustration, the invention is embodied, very generally, in a safety circuit 11 having at least one seat sensor 12 which is associated with a seat location 14 and operatively associated with a portion 15 of a seat 16 for deflection upon the presence of predetermined weight, e.g., 35 pounds, at its associated seat location. The safety circuit 11 also includes switch means 17 comprising a switch 18 preferably located within a retractor 21 for the seat belt and operated upon extension of the belt when buckling the belt about the person. Alternatively, another switch (not shown) may be incorporated into the seat belt buckle for operation upon fastening and unfastening the seat belt. If a seat sensor device 12 is operated, indicating the presence of a person at a seat location, without the associated seat belt switch 18 being operated because the safety belt is not in use, then the safety circuit activates a control or alarm circuit 22 either to flash a warning light or to cut off the vehicle ignition until such time as the seat belt is used and the seat belt switch 18 therefor is operated.

Typically, the seats 16 of the usual bucket or bench kind are not made to rigid and exacting specifications. Hence, any given seat portion 15 to which the conventional seat sensor is attached may be displaced relative to another portion of the seat or to the vehicle body by a distance which would cause faulty operation of the switch when the seat portion 15 is deflected if the switch only operated relative to a fixed reference location within the vehicle or the vehicle seat 16. Such fixed reference position switches would be difficult to install in a proper operating position because of the seats having such wide tolerance variations. Also, fixed position switches are subject to faulty operation when the seat begins to sag after extended use thereof. That is, after sagging of the seat, a smaller deflection of the seat would operate the switch. Thus, very light objects on the seat could operate the switch when it should remain unoperative. Therefore, for a seat sensor to be commercially acceptable, it should be installed readily, accommodate variations in seat dimensions, and have a long life and a low cost. Cost is a highly important consideration in the commercial acceptance of a seat sensor as they are used by the millions in automobiles and hence even small savings in cost result in large annual savings.

In accordance with the present invention, the seat sensor 12 is formed of simple and low cost elements and at a substantially lower cost than the presently used beam switch. The seat sensor 12 is operable by deflections of the seat portion 15 in either the upward or downward direction irrespective of the position of the seat portion 15 when it is empty or when it is finally displaced by a person of weight greater than the predetermined minimum weight, e.g., 35 pounds. Stated differently, the seat sensor 12 measures downward deflection of a seat when a person or thing sets thereon and, if the increment of deflection is of a predetermined extent initially, then a switch means 31 is operated. Similarly, the seat sensor 12 measures upward deflection of the seat when a person or thing is removed from the seat and if the deflection is of a predetermined extent initially, then the switch means 31 is operated. Also, as will be explained in greater detail, the total upward or downward deflection of the seat may be much greater than the increment caused by placing or removing 35 pounds from the seat.

More particularly, in accordance with the preferred embodiment of the invention, the seat sensor 12 comprises means in the form of an extensible seat follower 25 connected at one end to a movable seat portion 15 and operatively connected at its other end to the vehicle for retraction and protraction to measure seat deflection. The seat follower is preferably coiled and is mounted or supported at one end thereof for coiling and uncoiling with seat deflections. A coupling means 33 of the over travel kind is connected to the seat follower 25 and allows it to continue to protract or retract through a displacement greater than is needed for the coupling means 33 to cause a switch actuator means 34 to shift the switch means 31 from one condition to another condition. Thus, the coupling means 33 and switch actuator means 34 will operate the switch means 31 after a short initial upward or downward incremental protraction or retraction of the seat follower 25 irrespective of the total protraction or retraction of the seat portion 15 and the seat follower 25.

In accordance with the illustrated embodiment of the invention, the coupling means 33 is in the form of a friction clutch 35 and the switch actuator means 34 is in the form of a turnable cam 36 limited to a short arcuate travel by a stop means 38 with the friction clutch 35 slipping as the seat follower 25 continues to travel with seat deflection. Preferably, the seat follower means 25 is a cable 37 which is protracted or retracted by a retracting means in the form of a rotatable drum or reel 39 with the cable winding on the reel during downward deflection of the seat portion 15 and with the cable paying out from the reel 39 during upward movement of the seat portion 15. Also, as will be explained in greater detail, the reel 39 is on the input or drive side of the friction clutch 35, and the switch actuator cam 36 is on the output or deiven side of the clutch 35. The clutch slips when the cam is stopped at a limit position as determined by the stop means 38 and the reel continues to turn to wind up or to pay out cable. Herein, the stop means 38 comprises a pin 41 projecting into a peripheral groove 43 in the cam to abut a radially extending end wall 44 or 45 in the groove 43 after a short arcuate turning of the switch actuating cam 36 by the clutch 35. The illustrated switch means 31 comprises simple make or break contacts of the normally open kind with a movable spring contact 47 biased to an open position and forced to a closed position by a lobe or portion 49 of the switch actuator cam 36.

In contrast to the long beam switch, the seat sensor 12 may be considerably smaller, e.g., about 1 ¾ inch by 1 ¾ inch by ½ inch thick.

Referring now in greater detail to the individual elements of the seat sensor device 12, the reel 39 for retracting or paying out the cable 37 is generally disk shaped with an outer circular surface having a groove 51 onto which may be wound several coils or windings of the cable 37. For the purpose of securing one end of the cable 37 to the reel, a slot 52 (FIG. 4) is provided in bottom wall 53 of the cable receiving groove 51 to receive an enlarged bead 55 secured to the cable end to prevent its sliding through the slot 52. An attaching means 57 for attaching the other end of the cable to a seat portion 15 is secured to the end of the cable extending exteriorally of a frame 61 for the seat sensor 12. The attaching means 57 is hook shaped in this instance, although it may be in various shapes or forms and is larger than the diameter of a bore 63 in the frame 61 through which the cable travels, thereby limiting the winding of the cable on the reel 39 and maintaining the attaching means 57 accessible for quick connection to the seat.

When the seat sensor 12 is installed, a portion of the cable 37 will be unwound and the attaching means 57 will be secured to a portion of the seat 16 or to another portion of the vehicle without the necessity that the seat sensor 12 have an exact position or reference height relative to either the seat portion 15 or to the frame of the vehicle. The seat sensor frame 61 is provided with hook means 64 for attaching the frame 61 to another portion of the seat or to another portion of the vehicle. The hook means allows pivotal connection to a seat portion or another portion of the vehicle without having to have exact alignment or positioning of the sensor frame relative to the seat. Herein, the cable 37 is illustrated as pulled outwardly and upwardly and hooked to an overhead portion 15 of the seat with the frame 61 being attached to a non-deflectable portion of the vehicle which may be a stationary portion of the seat 16 or a stationary portion of the vehicle frame. Alternatively, the frame 61 may be uppermost and attached to the seat spring with the cable extending downwardly therefrom and attached to a lower non-deflectable vehicle portion. It is also possible to attach both attaching means 57 and 64 to relatively movable spaced portions of the seat springs. The flexibility and relatively limitless length of the cable permits attachment at almost any convenient or desirable location without problems of misalignment. Additional attachment positions could be made available by using cable guides, such as pulleys. One possibility is to incorporate the switch in the retractor housing mounted to the frame of the vehicle, with the cable end attached to the seat.

The reel 39 is formed with a central hub 65 mounted on a cylindrical sleeve 67 for turning about an axis 71 through the sleeve 67. The cylindrical sleeve has an internally threaded bore to threadingly receive the threaded ends of screws 69 having shanks threaded therein and having heads 73 abutting the outer sides of parallel frame plates 75 and 77 of the frame 61. Opposite ends 81 of the sleeve 67 abut the insides of the side plates 75 and 77 to space the side walls apart. The width of the reel hub 65 between opposite sides is slightly less than the distance between parallel inner facing sides of the frame side plates 75 and 77 to permit free motion. To provide a lower cost hub, the sleeve 67 may be eliminated by molding an integral cylindrical post projecting from the side wall 75 to the other side wall 77 which may have an aperture therein to receive a reduced diameter end on the post.

The reel 39 is biased to wind the cable 37 by a biasing means in the form of a clock spring 85 which is disposed in an annular cavity 87 formed in the reel 39 and encircles an inner annular wall 91 formed on and projecting inwardly from the side frame plate 75. An outer end of the clock spring 85 is fastened to the reel 39 by means of a hook-shaped end 94 which is inserted through the slot 52 and hooked to a portion 95 of the annular wall 53. An opposite end of the clock spring is formed with a hooked end 101 inserted into a slot 103 formed in the annular frame wall 91. Thus, in this instance, the clock spring acting between the frame 61 and the wall 53 of the reel 39 biases the reel to rotate in the clockwise direction as seen in FIG. 4 to wind the cable fully until the hook attaching means 57 abuts the frame 61.

The over travel and friction clutch coupling means 33 between the reel 39 and the switch actuator cam 36 comprises a first friction clutch face 105 on the reel in frictional engagement with a second friction clutch face 107 on the cam 36. The first friction clutch face 105 is generally frusto-conical in shape and is coaxial with the axis 71 of the reel and extends from and is formed on an inclined wall 106 of the reel 39 extending between annular wall 108 joined to the reel hub 65 and an annular wall 109 of larger diameter. The clutch face 105 defines a hollow conical cavity receiving the clutch face 107 which has a complementary frustro-conical surface biased into engagement with the clutch face 105. In this instance, the coupling means 33 further comprises a biasing means in the form of a coiled spring 117 which urges the clutch faces 105 and 107 into engagement with one another at all times. The coiled spring 117 has one end engaging the inner side of the side frame plate 77 and its other end abutting a surface 121 at the end of a cylindrical opening in a hub 123 for the cam 36. The spring 117 is coaxially mounted about the cam hub 123 and assures that the clutch faces 105 and 107 are evenly engaged with each other about the axis 71.

The switch actuating cam 36 is preferably a molded plastic part which has its cam lobe 49 intergrally molded thereon and projecting radially outwardly from an outer annular wall 124 on the cam. The lobe 49 has a short arcuate length and has a leading edge 125 for contacting a curved section 127 of the contact 47. As shown in FIG. 4, when the cam is in one limit position, the stop pin 41 abuts end wall 44 of the cam slot 43. In this position, contact 47 is spaced from a stationary contact 129 secured to the frame side plate 77. When the cam 36 is rotated in the counterclockwise direction as seen in FIG. 4, the leading edge 125 of the lobe 49 abuts the arcuate section 127 of the contact 47, and flexes it about its fixed end 132 pinned to the frame plate 77 by a fastener 133. The fixed contact 129 also has an end 134 secured to the frame plate 77 by a pin 135. The flexing of the contact 47 into engagement with fixed contact 129 completes an electrical path through a lead 137 fastened by a screw 138 to the fixed contact 129 and through a lead 140 having one end fastened by a screw 161 to the end 132 of the movable contact 47.

The frame or housing 61 for the illustrated seat sensor 12 includes four standoffs 151 extending between the side frame plates 75 and 77 and located at each of the corners of the generally rectangular frame 61. In this instance, the standoffs 151 each comprises a cylindrical sleeve 153 having opposite ends abutted against the interior sides of the frame plates 75 and 77. The sleeves 153 are interiorly threaded and threaded shanks on screws 156 are inserted through apertures in frame plates 75 and 77 and threaded into the ends of the sleeves. Outer enlarged heads on the screws 156 are tightened to abut the heads against the frame plates 75 and 77 and to press the latter tightly against the ends of the sleeves 153. Alternatively, rivets may be used rather than the sleeves 153 and screws 156 to provide a lower cost fastening of frame plates 75 and 77 together.

The frame 61 is generally open along three sides thereof with a spacer block 160 closing the fourth side and having a bore 63 (FIG. 4) therein through which the cable 37 travels. The hooks of the attaching means 64 are integrally formed on the lower end of the spacer block 160. Alternatively, each of the open three sides may be provided with a side wall to enclose all of the sides of the frames 61 to provide a protective housing for the switch contacts.

Figure 3:
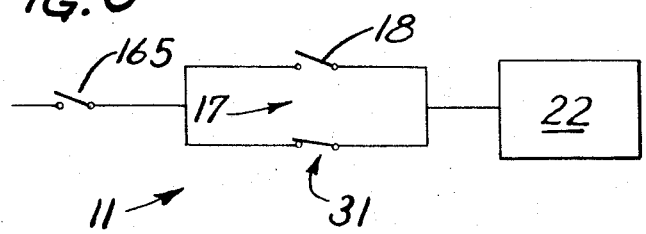
FIG. 3 is a diagrammatic illustration of a safety circuit in which the seat sensor of FIG. 1 may be employed
Figure 2:
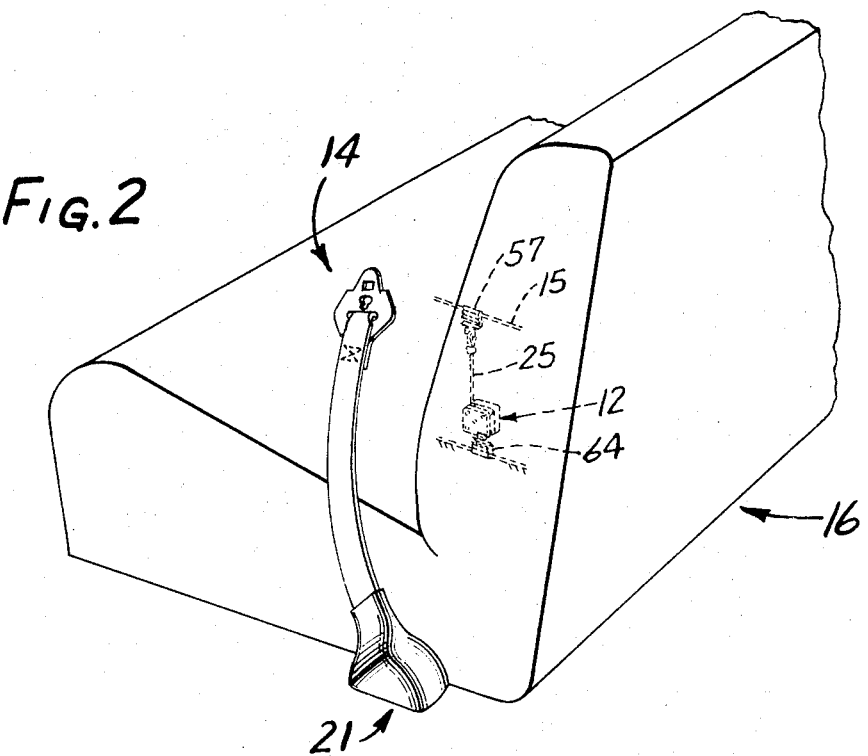
FIG. 2 is a diagrammatic view of a seat sensor in a vehicle seat.

A brief description of the operation of the invention will be given as an aid to understanding the seat sensor 12. The seat sensor switches 31 are closed in the seat sensor 12 when the seat is unoccupied and the seat follower 25 is extended while the switches 18 associated with the seat belt retractors 21 are normally open. Of course, the contact positions could be varied by changes to the circuit 11. In the illustrated circuit 11, an ignition operated contact 165 (FIG. 3) closes when the ignition is turned on. When a person sits at the seat location 14, the normally closed switch 31 opens. Unless the seat belt is pulled from the retractor 21 causing the normally open switch 18 to close, the alarm circuit 22 will be operated. If the seat belt is used, then the switch 18, closes and prevents operation of the alarm circuit 22.

The seat sensor 12 may be positioned in the vehicle or in the seat 16 in various locations. In any event, the extent of initial relative movement between portions of the seat, caused usually by a person sitting on the seat or leaving the seat, is measured by the seat follower 25 and causes actuation of the switch means 31 when the extent of the initial seat deflection is of a predetermined initial increment such as would be caused by the minimum weight detected, for example, 35 pounds. Because of the slip clutch 35, the seat follower 25 may measure, by retraction or protraction thereof, seat deflections much larger than needed for operation of the switch means 31. For instance, the reel diameter may be about one inch in the illustrated embodiment of the invention and a deflection of the seat could conceivably allow retraction of or about 3.14 inches of cable 37. But only about 30° or one-twelfth of this initial retraction or about 0.26 inch retraction is needed to operate the switch means 31. Manifestly, the total distance for retraction or for switch operation may be adjusted from that described herein.

In the illustrated embodiment of the invention, the seat follower cable 37 is hooked to the seat portion 15 of the seat 16 by an attaching means 57 with the frame pivotally mounted to the seat by a hooked attaching means 64. Upon downward deflection of the seat portion 15, the clock spring 85 turns the reel 39 to wind the cable 37. Friction clutch face 105 on the reel 39 frictionally drives clutch face 107 on the cam 36 to turn the cam in the clockwise direction as viewed in FIG. 4 to shift cam lobe 49 from the curved portion 127 of the spring contact 47 to swing it free of engagement with the fixed contact 129, as shown in FIG. 4, against a stop pin 161 fastened to the frame 61. The cam 36 continues to turn in the clockwise direction until end wall 44 on the cam abuts stop pin 41 whereby the friction face 105 slips relative to the stationary face 107 as the reel 39 continues to wind the cable 37 thereon. Thus, the opening of the contacts 31 upon downward seat deflection depends on sufficient retraction of the cable and does not depend upon the initial reference position for the seat portion, which reference position may change as the seat sags thereby changing the height of the seat portion 15 relative to the supporting frame of the vehicle. With the present invention, there is no absolute initial reference position. Therefore, even after the seat has acquired a sag, the same initial increment of seat travel is required for turning the cam 36 either to remove lobe 49 from switch contact 47 or to engage the switch contact 47.

When the person rises from the seat 16, the seat portion travels upwardly pulling the cable 37 and unwinding it from the reel 39 which acts through the clutch faces 105 and 107 to turn the cam 36 in the counterclockwise direction, as seen in FIG. 4, to swing the lobe 49 against the curved portion 127 of the movable contact 47. The latter swings to the closed position at which it abuts the stationary contact 129. When the cam 36 turns through a short arcuate distance in the counterclockwise direction, end wall 45 thereon abuts the stop pin 41 whereupon the clutch face 105 slips relative to clutch face 107 as the cable continues to be unwound as pulled upwardly by the seat portion 15. Therefore, the switch contacts 31 close during the initial upward deflection of the seat through the predetermined distance irrespective of the total maximum upward return distance for the seat portion 15 and irrespective of the ultimate height to which the seat portion 15 returns relative to the vehicle frame.

The reference herein to a predetermined weight as causing a switch actuation assumes that the seat springs will continue to maintain with age and usage the same spring constant. If the spring constant changes, the seat deflection will change for a given weight of 35 pounds. As the seat sensor 12 senses and measures seat deflection rather than weight, a change in spring constant could also affect the operation of the seat sensor 12. However, the seat springs should not change so substantially as to make this a serious concern.

While the illustrated embodiment of the invention uses a clock spring 85 to wind the cable 37 onto the reel 39, another embodiment of the invention has been made with a seat follower means 25 in the form of a coiled strip of metal or plastic which is inherently biased to return to its coiled condition. Thus, the seat follower means 25 serves dual functions of following the seat displacement as does the cable 37 and biasing the reel 39 to turn as does the coiled clock spring 85.

From the foregoing, it will be seen that the seat sensor is small as compared to a beam switch and can be readily installed in a greater number of positions in seats without having to have an exact reference position in the seat. As compared to a beam switch seat sensor, the seat sensor of the present invention is substantially lower in cost to manufacture. The seat sensor 12 is rugged, has few parts, and will operate for a large number of cycles.

While a preferred embodiment has been shown and described, it will be understood that there is no intent to limit the invention by such disclosure, but rather, it is intended to cover all modifications and alternate constructions falling within the spirit and scope of the invention as defined in the appended claims.

What is claimed is:

1. In a vehicle including the combination of a seat, an electrical circuit and a seat sensor for sensing a resting of a minimum weight on said seat and the removal thereof from the seat, the improvement comprising a seat sensor having an elongated flexible seat follower, said seat following being connected at one end to a movable portion of the seat and at another end to another portion of said vehicle to measure deflection of said movable seat, retractor means at one end of said seat follower mounting the same for coiling and uncoiling with deflections of said movable seat portion, switch means for said seat sensor connected to said electrical circuit and operable between a first condition and a second condition, switch actuator means for actuating said switch means between said first and second conditions with deflections of said movable seat portion through a predetermined distance, and a coupling means coupling said seat follower to said switch actuator means to cause said switch actuator means to operate said switch means to said first condition upon an initial deflection of said movable seat portion through said predetermined distance and allowing continued coiling of said seat follower through a distance greater than said predetermined distance, said coupling means causing said switch actuator means to operate said switch means to said second condition upon upward movement of said movable seat portion through said predetermined distance and an initial uncoiling of said seat follower and also allowing continued uncoiling of said seat follower with further upward motion of said seat portion.

2. The combination in accordance with claim 1 in which said coupling means comprises a friction clutch for turning said switch actuator means between first and second limit positions and in which stop means limits the turning of the said switch actuator means at said limit positions causing said friction clutch to slip as said seat follower travels with said movable seat portion through a distance greater than said predetermined distance.

3. The combination in accordance with claim 2 in which said retractor means at said one end of said seat follower comprises a frame and a reel rotatably mounted in said frame, and a biasing means biases said reel to turn and coil said seat follower during downward deflection of said seat, said seat follower uncoiling and paying out from said reel when said seat portion moves upwardly.

4. The combination in accordance with claim 3 in which said friction clutch comprises a driving clutch face connected to said reel and further comprises a driven clutch face connected to said switch actuator means for turning the latter, said friction clutch faces slipping to allow said reel to coil said seat follower after said switch actuator means is held by said stop means in a limit position.

5. The combination in accordance with claim 4 in which said switch actuator means is a turnable cam having a lobe for operating said switch means upon turning of said cam between limit positions, said reel and said cam being coaxially mounted, said clutch faces being coaxial and frustro-conical.

6. The combination in accordance with claim 5 in which said seat follower is a cable, a hooked attaching means is provided on said cable for connecting it to said movable seat portion, and said frame is pivotally connected to said vehicle.

7. A seat sensor for a vehicle seat and for connecting to an electrical safety circuit comprising: an elongated extensible seat follower for measuring deflections of a seat and having one end thereof for connection to a portion of said seat and moving a predetermined distance when predetermined weight is disposed upon said seat, retractor means for winding up said extensible member with downward movement of said seat and for paying out said extensible seat follower with upward movement of the portion of said seat, switch means operable to a first condition to indicate the disposition of at least said predetermined weight on said seat and operable to a second condition to indicate removal of at least said weight from said seat, a switch actuator means for actuating said switch means to said first condition upon initial incremental downward movement of said one end of said seat follower by said predetermined distance and to said second condition upon initial incremental downward movement of said one end of said seat follower by said predetermined distance, coupling means coupling said seat follower to said switch actuator means to cause the latter to actuate said switch means with seat deflections of said predetermined distance and allowing continued protraction or retraction of said seat follower as said seat portion deflects to an extent greater than said predetermined distance needed for switch operation.

8. A seat sensor for a vehicle seat in accordance with claim 7 in which said switch actuator means comprises a turnable cam for turning through a limited extent of movement and in which said coupling means allows said seat follower to undergo continued movement when said cam is at a limit position.

9. A seat sensor in accordance with claim 8 in which said retractor means comprises a rotatable reel for coiling said seat follower thereon with deflection of said seat in a downward direction, and in which said coupling means comprises a friction clutch between said reel and said cam for turning said cam between said limit positions and for slipping to allow said reel to continue to take up or pay out said seat follower when said cam is at each of its limit positions.

10. A seat sensor in accordance with claim 9 in which a spring biases said reel to turn and coil said seat follower thereon, and in which clutch faces on said friction clutch are biased into engagement with one another.

11. A seat sensor in accordance with claim 7 in which said switch actuator means comprises a turnable cam having a first portion for operating said switch means, a stop means limits turning of said cam in either direction to less than one revolution, said seat follower comprises a cable, said retractor means includes a rotatable reel for winding said cable thereon with downward deflection of said seat, and said coupling means comprises a slip clutch between said reel and said cam for slipping when said stop means is limiting said cam against turning and said reel is continuing to turn to retract or to protract said cable.

12. A seat sensor for measuring deflection of a vehicle seat relative to a vehicle frame and for connection to an electrical circuit comprising: a support, an extensible, coilable seat follower for protracting and retracting with deflection of said vehicle seat, a reel mounted on said support and connected to one end of said seat follower for winding and unwinding said extensible seat follower, a switch means operable to a first condition to indicate a predetermined weight on said seat and to a second condition to indicate removal of said weight from said seat, a turnable member movable in opposite directions between a first limit position for actuating said switch means to said first condition and a second limit position for actuating said switch means to said second condition, and means frictionally and drivingly connecting said reel and said turnable member to turn said turnable member with initial retraction of said seat follower of a predetermined increment to said first limit position and to turn said turnable member with initial protraction of seat follower of a predetermined increment to said second limit position, said friction driving and connecting means allowing said reel to continue turning to retract or protract said seat follower after said predetermined increment of retraction or protraction of said seat follower.

* * * * *